Patented June 15, 1937

2,084,043

UNITED STATES PATENT OFFICE 2,084,043

CONDENSATION DERIVATIVES OF RUBBER

Thomas C. Morris, Akron, Ohio, assignor to Wingfoot Corporation, Wilmington, Del., a corporation of Delaware No Drawing. Application September 19, 1935, Serial No. 41,292

4 Claims. (Cl. 260—1)

This invention relates to the oxidation of condensation derivatives of rubber and the preparation of resinous compounds suitable for use in cooked varnishes, etc. The use of such compounds in cooked varnishes is described and claimed in copending application Serial No. 41,-293, filed Sept. 19, 1935.

Condensation derivatives of rubber may be prepared by treating rubber with the halide of an amphoteric metal such as tin tetrachloride or chromic chloride or by treating rubber with a compound such as chlorostannic acid. The term condensation derivative of rubber is used in the claims to include such compounds and similar compounds which may contain other elements.

For most purposes it is advantageous to employ such compounds in a substantially unoxidized condition. However, for certain uses such as the preparation of cooked varnishes, an oxidized product is preferred. On heating in air the condensation derivatives of rubber become oxidized and unless the conditions of oxidation are carefully regulated the product will oxidize so rapidly as to generate sufficient heat to cause charring or burning of the rubber derivative.

According to this invention the oxidation is effected under carefully controlled conditions. A current of air is circulated through the drying apparatus during the oxidation to prevent local overoxidation and the oxidation is carried out at an elevated temperature to accelerate it. The temperature at which the oxidation is effected will depend to some extent upon the softening point of the product being treated. Condensation derivatives of rubber with a higher softening point are advantageously oxidized at a higher temperature. With a condensation derivative of rubber having a softening point in the neighborhood of 25-40° C., an oxidizing temperature in the neighborhood of 60° is preferred. The product is advantageously agitated during oxidation. (Throughout the specification and claims softening points are to be determined by the A. S. T. M. method for distortion under heat. A. S. T. M. designation D 48-30.)

The preferred condensation derivative is obtained by dissolving in benzene 10% by weight of pale crepe rubber which has been plasticized to a condition such that a $\tfrac{2}{5}$ cubic inch sample when placed on a flat plate beneath a flat 10 kg. weight for 2½ minutes in a cabinet heated to 70° C. (the sample being previously heated to this temperature) is flattened out to a thickness slightly less than ⅛". This corresponds to a plasticity of about 860 as measured by a Williams plastometer.

Three hundred and fifty gallons of the cement so prepared is treated with 10% by weight of chlorostannic acid in a Day mixer equipped with an agitator and reflux condenser and heated and agitated for three hours at 65-80° C. Samples are then taken every few minutes and viscosities determined by suitable means. The reaction is continued until cement of a predetermined viscosity is obtained. In general a reaction period of about six hours will be required although this varies from batch to batch. A satisfactory product may be obtained from cement which has been reacted to a viscosity of about 1-1.2 minutes when measured by a Gardner mobilometer of the following dimensions:

Thickness of plunger_____inches__ 0.066
Diameter of plunger disc_____do____ 1.502
Diameter of plunger shaft_____do____ 0.248
Inside diameter of cylinder containing test
  sample_____inches__ 1.535
Height of cylinder_____do____ 9.0
Length of plunger shaft_____do____ 20.0
Distance between the two marks on plunger shaft_____inches__ 7.484
Total weight of shaft, top weight and
  disc_____grams__ 68.6

The reaction may be stopped by adding a small amount of water to the reaction mixture. The reacted cement is cooled and filtered and poured into a large amount of water containing a reducing agent, for example ¾ ounce of sodium sulfite per gallon of the reacted cement. This mixture is agitated to maintain an emulsion and steam distilled to remove the solvent. The condensation derivative is thus precipitated.

For cooked varnishes the oxidized product obtained from the condensation derivative of rubber with a softening point in the neighborhood of 28-38° C., is preferred, and such a product which has been increased in weight by 4 or 5% by oxidation is quite satisfactory. The oxidation apparently occurs by solution of the oxygen in the condensation derivative of rubber and then oxidation by this dissolved oxygen. Whatever the exact process it is advantageous to oxidize the material in relatively small lumps. This allows greater access of the air or oxygen to the material and produces more uniform oxidation. Furthermore, where large lumps are employed local oxidation within a lump is liable to cause such a temperature rise within the lump as to char or burn the material. Lumps passing through a 30-40 mesh screen are of a preferred size for oxidation. The finely divided precipitate obtained by the steam distillation of an emulsion containing the condensation derivative of rubber as described above, is when dried, very suitable for oxidation. Agglomerates of the fine precipitate formed on drying need not be broken down to individual particles for oxidation, since agglomerates which pass through a 30-40 mesh screen may be readily oxidized.

Condensation derivatives of rubber of very low softening point cannot easily be oxidized at elevated temperatures because on heating they soften and flow together and large lumps or blocks thus formed are not readily oxidized. For the present process, unoxidized material with a softening point of at least about 25 or 28° C. is therefore preferred. Such material, if of low softening point, may be oxidized at a relatively low temperature, or if harder material is employed, a higher oxidizing temperature may be utilized. Condensation derivatives of rubber with a softening point of about 40° C. or above give hard, brittle oxidation products which are not as satisfactory for the preparation of cooked varnishes as products produced by the oxidation of a material of lower softening point.

Very satisfactory results have been obtained with a substantially unoxidized product having a softening point of about 28-33° C. by circulating air over the subdivided material at a temperature of 60° C. for about 24 hours or longer. The length of heating will depend on the temperature employed and the degree of oxidation desired, and also upon the conditions prevailing within the heating device such as the air circulation, the oxygen provided, etc. An increase in weight of about 3⅓% up to 6% or 9% by oxidation gives an improved resin for use in cooked varnishes.

For this process a circulating air drier has been used with very satisfactory results. The substantially unoxidized material was divided into small lumps and placed in pans in the drier. The drier was heated and a uniform temperature maintained by circulating hot water at a temperature of about 86° C. through the coils on which the pans were supported. A fresh supply of air was circulated through all parts of the drier and over the pans. A rotary drier may be used although this may give difficulty due to the tendency of a resin to ball up in such an apparatus, and also due to the dusting of the balled material after it has been oxidized sufficiently to make the exterior of the ball relatively hard. One advantageous way of carrying out the operation is to take the unoxidized product precipitated by steam distillation of the solvent from the emulsion containing the reacted cement (as described above) and place this in drying pans and dry it in an oven equipped with a vacuum. After drying, the vacuum apparatus may be utilized for conducting a slight current of air through the drier to maintain a uniform temperature in all parts of the drier and to conduct away heat from any spot at which oxidation may have become localized. In this way the same drier may be used for drying and subsequently oxidizing the product.

After the desired oxidation has been effected the oxidized product should be cooled or otherwise treated to prevent over-oxidation. If the warm, freshly oxidized product is stored without first being cooled, oxidation may continue in storage and sufficient heat may be generated to char or burn the product. A preferred method of treatment includes milling the material soon after oxidation is completed, in order to reduce the specific surface and thus limit the possibility of further oxidation. The milled product may then be ground to a suitable particle size for use.

I claim:

1. A method of preparing an oxidized condensation derivative of rubber obtainable by the action on rubber of either a halide of an amphoteric metal or chlorostannic acid, which comprises heating the condensation derivative of rubber in contact with air while circulating heated air over the surface of the derivative to equalize the temperature thereof and prevent local overheating.

2. The method of preparing an oxidized condensation derivative of rubber obtainable by the action on rubber of either a halide of an amphoteric metal or chlorostannic acid, which comprises heating a substantially unoxidized condensation derivative of rubber with a softening point of 28-38° C. in a current of air at a temperature of about 60° C. until oxidized.

3. The method of preparing oxidized condensation derivatives of rubber which derivatives are obtainable by the action on rubber of the halide of amphoteric metal or of chlorostannic acid, which comprises heating the condensation derivative of rubber in an oxygen-containing atmosphere while circulating the atmosphere over the rubber derivative.

4. The method of obtaining oxidized condensation derivatives of rubber which comprises subjecting to a current of heated air lumps of a condensation derivative of rubber obtainable by the reaction on rubber of either a halide of amphoteric metal or chlorostannic acid.

THOMAS C. MORRIS.